Feb. 24, 1925.

H. G. McCOMB 1,527,595

TRACTOR

Filed Sept. 25, 1920 3 Sheets-Sheet 1

INVENTOR:
Henry G. McComb
by MacLeod, Calver, Copeland & Dike
Attys.

Feb. 24, 1925.

H. G. McCOMB

TRACTOR

Filed Sept. 25, 1920

INVENTOR:
Henry G. McComb
by MacLeod, Calver, Copeland & Dike
Attys

Feb. 24, 1925. 1,527,595
H. G. McCOMB
TRACTOR
Filed Sept. 25, 1920   3 Sheets-Sheet 3

INVENTOR:
Henry G. McComb
by Macleod, Calver, Copeland & Dike
Attys.

Patented Feb. 24, 1925.

1,527,595

UNITED STATES PATENT OFFICE.

HENRY G. McCOMB, OF NEW YORK, N. Y., ASSIGNOR TO WORLD HARVESTER CORPORATION, OF NEW YORK, N. Y., A CORPORATION OF DELAWARE.

TRACTOR.

Application filed September 25, 1920. Serial No. 412,636.

*To all whom it may concern:*

Be it known that I, HENRY G. McCOMB, citizen of the United States, residing at 2450 Creston Avenue, New York, county of New York, State of New York, have invented a certain new and useful Improvement in Tractors, of which the following is a specification, reference being had therein to the accompanying drawings.

My invention has for its object a new and improved farm tractor or tiller capable of being used to haul plows or vehicles and do cultivating and general farm work. The particular object of the invention is to provide a machine of the character in question which will be capable of doing all the work ordinarily done on a farm by a pair of horses. I have shown the tractor embodying my invention in the type of a walking cultivator, that is, the type provided with handles which are held by the operator to guide it in the manner that the handles of an ordinary horse-drawn plow or cultivator are held by the workman. The tractor embodying my invention has two large driving wheels on which practically the entire weight of the device is carried. The entire space between the wheels and below the line of the axle of the driving wheels is open and unimpeded so that the machine may be used to straddle the row in cultivating. In a small sized machine embodying my invention a clearance of about 19 inches from the ground is easily obtained.

A special object of the present invention is to so construct the tractor that a minimum of vibration will be transmitted from the engine to the hands of the operator. Heretofore, in tractors of this general character, a serious difficulty has been the fact that the vibration has been excessive so that operation of the tractor was very fatiguing work. These desirable results are accomplished chiefly by the type of engine and the novel location and arrangement of the engine flywheel and the related parts with reference to the driving wheels of the device. In practice, I employ a two-cylinder internal combustion engine having horizontally opposed cylinders acting on a crank shaft which is lengthwise of the machine, there being a flywheel and friction clutch placed in a vertical plane with one of their faces closely adjacent and parallel with the vertical plane passing through the axis of the driving wheel. To permit the greatest possible size for the engine, I make the wheels dish-shaped and place the cylinders of the engine with their ends extending beyond the planes of the proximate faces of the dish-shaped wheel. This makes possible the use of an engine with relatively long cylinders without increasing the tread of the vehicle. The peculiar location and arrangement of the engine and flywheel tend to cut down the vibration because the vibration produced by the engine is chiefly in a horizontal line parallel to the axis of the driving wheels, so that this tendency to lateral vibration is absorbed by the wheels and the earth and does not tend to lift the machine up and down as is the case where a vertical engine is employed. Furthermore, the gyroscopic effect of the flywheel resists the tendency to vibration produced by the engine.

Another important feature of my invention is a simple, easily-operated mechanism for controlling the movements of the machine. The wheels are driven by a jackshaft on each end of which is located a pinion which may be unlocked from the jackshaft whenever it is desired to apply all of the power to one driving wheel. The machine is reversed by a simple reversing mechanism located on the jackshaft and operated by a pair of clutches working alternately.

Another important feature of my invention consists in making the frame of the tractor to which the axles for the driving wheels are attached in a unitary structure including the crank case of the engine, the flywheel casing and the transmission case. By so doing a very rigid construction is produced and expense of manufacture is considerably less.

Another important feature of my invention is the attachment of the drawbar hitch forward of the axis of the driving wheels, which tends to pull the wheels into the ground and increase traction making light-weight construction possible. Other important features of the invention will be more fully described hereafter.

The invention will be fully understood from the following description when taken in connection with the accompanying drawings, and the novel features thereof will be pointed out and clearly defined in the claims at the close of this specification.

In the drawings, Fig. 1 is a side elevation of the improved tractor embodying my invention.

Figure 2:
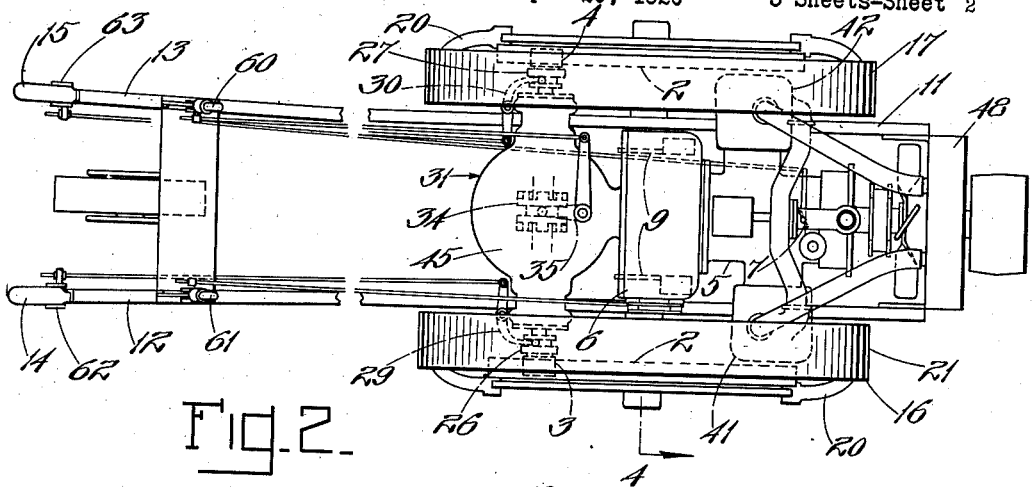
Fig. 2 is a plan view.

Referring now to the drawings, at 11 is shown the frame of the machine, this being extended rearwardly as shown at 12 and 13 and terminating in handles 14 and 15. At 16 and 17 are shown the two driving wheels, sometimes termed "bull wheels." These driving wheels are mounted on stub axles 18 and 19 and are dish-shaped, as will be clearly seen in Figures 3 and 4. Each wheel is provided with spokes 20 extending laterally so that the major portion of said spokes lies on the outside edge of the tread 21 of the wheel. Secured to the inner face of each wheel is a ring gear 2 which, in the form shown in the drawings, is an annular gear. A pair of pinions 3, 4, each of which is loosely mounted on the ends of the jackshaft 25, mesh with the said ring gears 2. Said pinions may be made fast to the jackshaft by dog clutches 26 and 27 slidable on the jackshaft. These clutches are operated by clutch levers 29 and 30 (see Figure 2). The jackshaft is mounted in a suitable housing 31 forming part of the frame of the machine.

On the jackshaft 25 are two bevel gears 32 and 33 loosely mounted thereon and facing toward each other. Each of these bevel gears is constructed to perform the function of one part of a dog clutch. In the form shown in the drawings, each gear is pierced by holes $a$ to receive the teeth $b$ on the dog clutch 34 which is slidable on the jackshaft 25, being moved thereon by the clutch lever 35.

At 36 is shown a bevel pinion which is constantly in mesh with the two bevel gears 32 and 33. The result of this construction is that when the dog clutch 34 is moved toward the left-hand wheel (the upward as viewed in Figure 3), the gear 33 is locked to the jackshaft by the dog clutch 34 and thereafter the pinion 36 drives the bevel gear 33 and jackshaft forward while the bevel gear 32 revolves loosely on the jackshaft. To reverse the machine, the dog 34 is moved in the other direction, thereby locking it to the pinion gear 32 after which the jackshaft is driven in the reverse direction while the pinion 33 revolves loosely on the jackshaft. The pinion 36 is mounted on a short shaft 38 one end of which engages a friction clutch 39. The friction clutch 39 forms part of a flywheel 40. The face $c$ of the flywheel is closely adjacent and parallel with the vertical plane passing through the axes of the two stub shafts 18 and 19 on which the driving wheels 16 and 17 are mounted. The flywheel is relatively heavy and has a gyroscopic effect which tends to resist any movement out of its plane. The chief gyroscopic effect is in the vertical plane parallel to the plane of the axes of the stub shafts and therefore the flywheel assists materially in absorbing any vibration which would otherwise tend to be transmitted to the wheels of the vehicle and thence to the handle bars.

Figure 3:
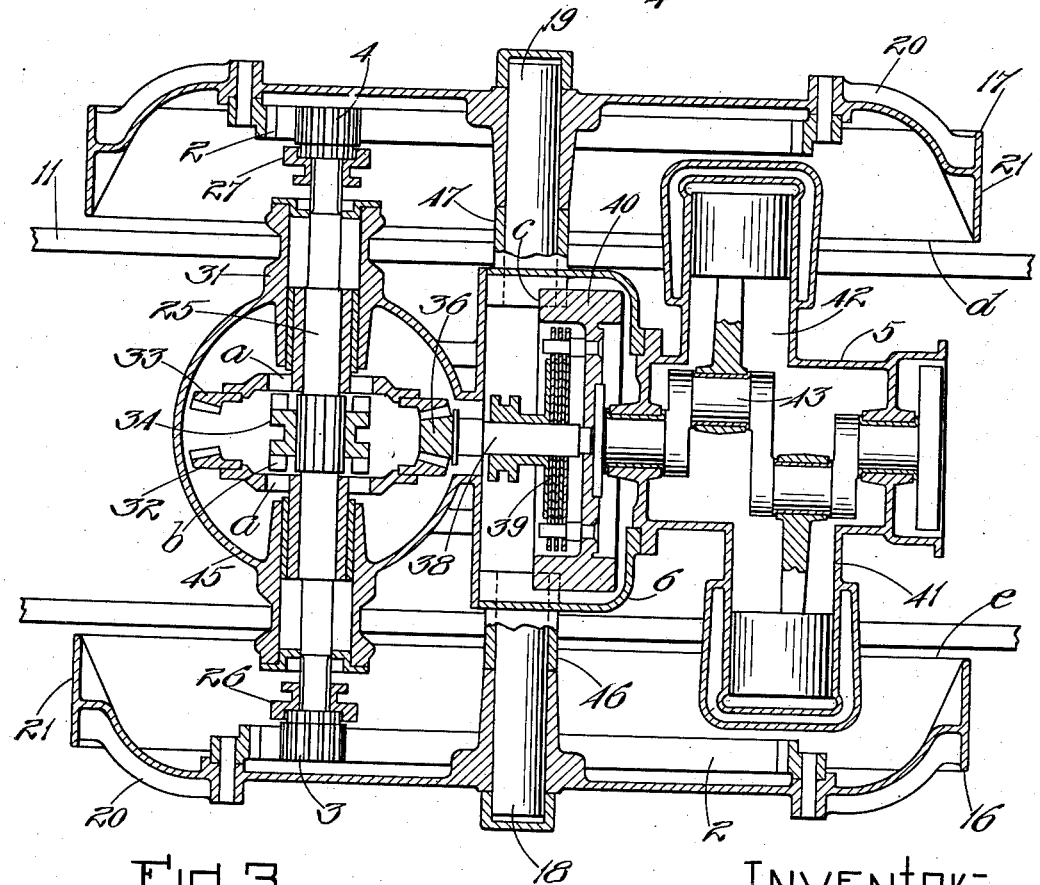
Fig. 3 is an enlarged horizontal section taken through the power plant and driving wheels.
Figure 4:
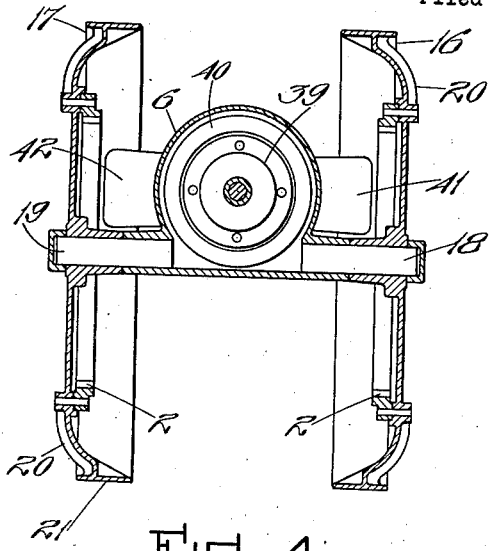
Fig. 4 is a section taken on line 4 of Figure 2.
Figure 5:
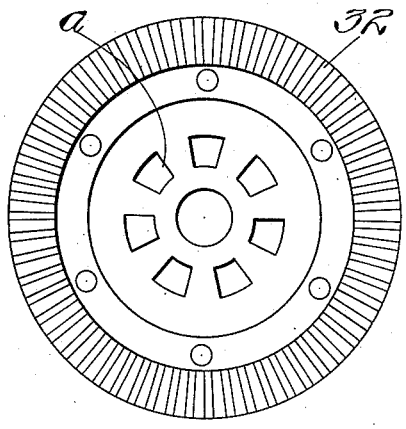
Figs. 5 and 6 are detail views of the dog clutch mechanism which gives the tractor a forward or reverse movement.
Figure 8:
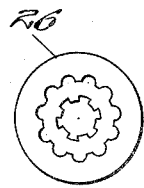
Figs. 7 and 8 are detail views of the clutch mechanism for locking the jackshaft to the driving pinions.
Figure 7:
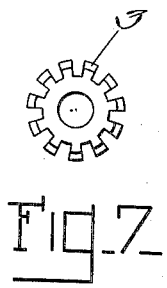
Figure 6:
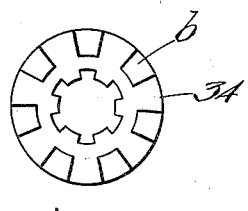

The engine shown in the accompanying drawings comprises a pair of horizontal cylinders 41 and 42 placed on opposite sides of the two-throw crankshaft 43. The crankshaft runs lengthwise of the engine, and its axis lies considerably above the axes of the stub shafts, as will be clearly seen in Figure 1. In practice, I employ a two-cylinder four-cycle engine of what is conveniently termed the horizontally opposed type. The ends of the cylinders 41 and 42 extend well beyond the planes $d$ and $e$ formed by the inner proximate faces of the driving wheel, as shown in Figure 3. It will thus be seen that the dish-shaped construction of the said driving wheels makes possible the use of the horizontally opposed engine of a size much larger than would otherwise be possible.

The cylinders 41 and 42 are each cast integral with one-half of the crank case 5, the said crank case being divided along a vertical plane. The flywheel and the clutch casing 6, crank case 5, the transmission casing 45 and portions of the frame 46 and 47 which support the stub axles 18 and 19, all form a unitary structure. This construction takes all the load off the frame members 12 and 13 to which the handle bars are connected. The radiator 48 is, however, carried on the front end of the frame members 12 and 13. On the front end of the crankshaft 43 is located a pulley 50 and in front of that is a crank 51 by means of which the engine may be started. The dog 34 which connects the bevel pinions alternately to the jackshaft is operated by the control lever 60 which is also connected up with and operates the throttle 7 of the engine. In its forward position, the lever 60 places the forward gear 33 in mesh with the dog, while in its rear position it places the reverse gear 32 in mesh. The clutch is operated by the control lever 61. In its forward position, the clutch is engaged, while in its rear position the clutch is disengaged. The pinion clutches 26 and 27 are operated by the finger levers 62 and 63 respectively, and are normally held in engagement with the pinions 3 and 4 by springs 8 one of which is shown in Figure 1.

Figure 1:
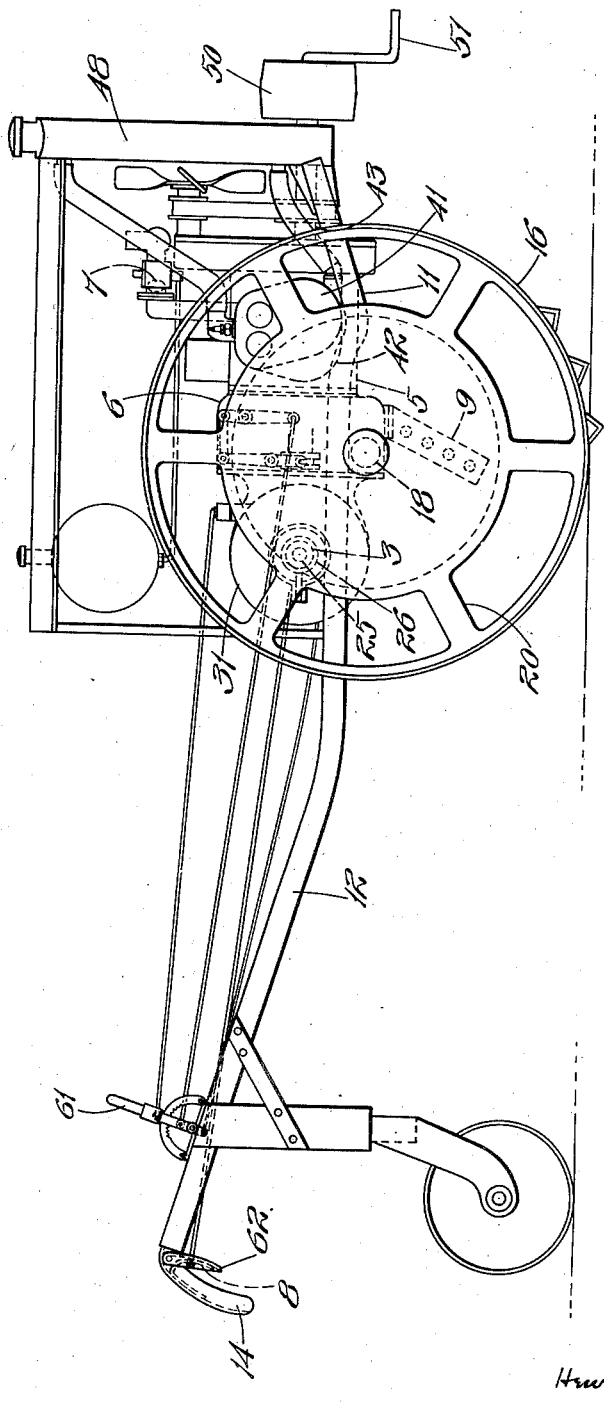

At 9 is shown the drawbar hitch which is attached to the frame of the machine at a point forward of and slightly below the axis of the driving wheels, as shown in Figure 1. This location of the drawbar hitch gives the tractor a tendency to pull the wheels into the ground and prevent them from spinning on the surface and also avoid a tendency to rear up as is the case where the hitch is placed at the rear of the axis of the driving wheels. It also increases traction.

In operating the machine, the reverse lever 60 is thrown into its forward or rear position and then the clutch lever is thrown forward engaging the clutch. The engine then drives the machine through the forward bevel gear 33 and the jackshaft. In guiding the machine, slight deviations from a straight line are made by the operator. He moves the handle bars accordingly. If, however, it is desired to make a sharp turn, one or the other of the pinion clutches 26 and 27 is released so that the drive is entirely through the opposite wheel, and the other wheel is free to revolve on its stub shaft. Thus, if a sharp turn to the left is desired, the pinion clutch 27 is released and the power is then applied wholly to the wheel 16, thus tending to swing the machine around to the point of contact between wheel 17 with the ground as a pivot.

What I claim is:—

1. The tractor including a pair of driving wheels and an internal combustion engine having opposed horizontal cylinders located between the driving wheels and in advance thereof with the axes of the cylinders parallel with the axis of the driving wheels.

2. The tractor including a pair of driving wheels and a four-cycle, horizontal, two-cylinder internal combustion engine having opposed cylinders located between the driving wheels with the axes of the cylinders parallel with the axis of the driving wheels.

3. The tractor including a pair of driving wheels, a horizontal opposed internal combustion engine located between the driving wheels with its crankshaft at right angles to the axis of the driving wheels, and having a flywheel closely adjacent and parallel to the vertical plane passing through the axis of the driving wheels.

4. The tractor including a pair of driving wheels mounted on stub axles, a horizonal opposed internal combustion engine located between the driving wheels forward of the stub axles with its crankshaft at right angles to the axis of the driving wheels, gears on the driving wheels, a jackshaft with pinions thereon engaging said gears behind the stub axles, and driving connections between the engine and the jackshaft.

5. The tractor including a pair of driving wheels, a horizontal opposed internal combustion engine with its crankshaft at right angles to the axis of the driving wheels, gears on the driving wheels, a horizontal jackshaft with pinions thereon engaging said gears, and a flywheel and clutch between the crankshaft of the engine and said jackshaft, said flywheel and clutch being in about the vertical plane passing through the axis of the driving wheels.

6. The tractor including a pair of dished driving wheels and an internal combustion engine located between said driving wheels and having horizontal opposed cylinders the axes of which are parallel with the axis of the driving wheels, said cylinders extending beyond the planes of the proximate faces of said driving wheels.

7. In a tractor, in combination with a pair of driving wheels, a horizontal opposed engine with its cylinders disposed parallel with the axis of the driving wheels, said engine being located between said driving wheels mainly above the said axis to afford a high clearance with a low center of gravity.

8. The tractor including a pair of dished driving wheels each provided with driving gears, pinions meshing with said gears, a jackshaft for said gears, an internal combustion engine located between said driving wheels and having horizontal opposed cylinders extending beyond the planes of the proximate faces of said driving wheels, and a flywheel and clutch between the engine and the jackshaft and closely adjacent and with their faces parallel to the vertical plane passing through the axis of the driving wheels.

9. A tractor including a pair of driving wheels, a horizontal opposed internal combustion engine with its crank shaft at right angles to the axis of the driving wheels, gears on the driving wheels, a horizontal jackshaft with pinions loose thereon engaging respectively said gears, means for making at will either of said pinions fast to the jackshaft to make driving connection with one of the driving wheels while the other pinion is loose, a fly wheel and clutch between the crank shaft of the engine and said jackshaft, said fly wheel and clutch being in about a vertical plane passing through the axis of the driving wheels.

10. A tractor including a pair of driving wheels, a horizontal opposed internal combustion engine with its crank shaft at right angles to the axis of the driving wheels, gears on the driving wheels, a horizontal jackshaft with pinions loose thereon engaging respectively said gears, means for making at will either of said pinions fast to the jackshaft to make driving connection with one of the driving wheels while the other pinion is loose, a fly wheel and clutch between the crank shaft of the engine and said jackshaft, said fly wheel and clutch being in about a vertical plane passing through the axis of the driving wheels, a shaft on which said fly wheel and clutch are mounted, and means for making driving connection between the fly wheel shaft and the jackshaft to rotate the jackshaft in either direction desired.

11. The tractor including a pair of driving wheels, pivotal mountings for the wheels, an engine between the driving wheels, a flywheel having its face parallel with the axis of the driving wheels, said tractor having a unitary frame which includes the crank case and flywheel casing of the engine and the axle casing for the driving wheels.

12. The tractor including a pair of driving wheels and an internal combustion engine located between the driving wheels and having horizontal cylinders, a flywheel located closely adjacent and parallel to a vertical plane passing through the axis of the driving wheels, a unitary frame for the tractor which includes the crank case of the engine and the flywheel casing, and stub axles for said driving wheels mounted on said frame.

13. The tractor including a pair of driving wheels each provided with driving gears, stub shafts for said driving wheels, pinions meshing with said gears, a jackshaft for said gears, an internal combustion engine located between the driving wheels and having horizontal cylinders, a flywheel and clutch, each having a face closely adjacent and parallel with a vertical plane passing through the axis of the driving wheels, and a unitary frame for the tractor, said frame including the crank case for the engine, the flywheel and clutch casing, and supports for the jackshaft and stub axles.

14. A tractor including a pair of driving wheels and a horizontally opposed engine located between the wheels with the axes of the cylinders parallel with the axis of the driving wheels, a unitary frame on which said driving wheels are mounted, said frame including the crank case and cylinder blocks of the engine, and being made in opposite parts each of which includes one cylinder block.

15. The tractor including a pair of driving wheels, an internal combustion engine having opposed cylinders arranged with their axes parallel with the axis of driving wheels, transmission mechanism and a flywheel, the engine and transmission mechanism being on opposite sides of the axis of the driving wheels, and the flywheel being closely adjacent to the vertical plane passing through the said axis of the driving wheels, the engine transmission mechanism and fly wheel being between the planes of the two driving wheels.

16. A tractor including a pair of dished driving wheels, an internal combustion engine having opposed horizontal cylinders with the axes parallel with the axis of the driving wheels, transmission mechanism and a flywheel, the transmission mechanism and the engine being on opposite sides of the axis of the driving wheels, and the said dished wheels partly enclosing the said engine and transmission mechanism.

17. The tractor including a pair of dished driving wheels, an internal combustion engine having opposed horizontal cylinders, a jack shaft with transmission mechanism thereon, said engine and jack shaft being on opposite sides of the axis of the driving wheels and the engine lying partly within the said dished wheels.

In testimony whereof I affix my signature.

HENRY G. McCOMB.